United States Patent [19]

Tokar

[11] 4,337,094
[45] Jun. 29, 1982

[54] ADDITIVE COMPOSITION FOR PORTLAND CEMENT MATERIALS

[75] Inventor: Valery Tokar, University Heights, Ohio

[73] Assignee: The Euclid Chemical Company, Cleveland, Ohio

[21] Appl. No.: 262,488

[22] Filed: May 11, 1981

[51] Int. Cl.³ .................................................. C04b 7/06
[52] U.S. Cl. ........................................ 106/90; 106/315
[58] Field of Search ................... 106/315, 90

[56] References Cited

U.S. PATENT DOCUMENTS

| | | | |
|---|---|---|---|
| 2,437,842 | 3/1946 | Uhler | 106/90 |
| 3,100,526 | 8/1963 | Martin | 106/315 |
| 3,427,175 | 2/1969 | Angstadt et al. | 106/89 |

FOREIGN PATENT DOCUMENTS 260479 10/1970 U.S.S.R. ............................. 106/315

Primary Examiner—O. R. Vertiz
Assistant Examiner—Margaret B. Medley
Attorney, Agent, or Firm—Alfred D. Lobo

[57] ABSTRACT

An additive composition has been formulated which accelerates the setting time, and also improves the compressive strength of Portland type cement, mortars and concretes. The additive composition consists essentially of a concentrated aqueous solution of calcium nitrate and a waste byproduct stream of a mixture of polyethanolamines (referred to as "triethanolamine bottoms") to which solution is added a minor amount of an alkali metal or alkaline earth metal salt of a polyhydroxy aliphatic compound such as gluconic acid, or of lignosulfonic acid.

10 Claims, No Drawings

ADDITIVE COMPOSITION FOR PORTLAND CEMENT MATERIALS

BACKGROUND OF THE INVENTION

This invention relates to additives for hydraulic cements and, more particularly, additives for concretes which are to contain metal reinforcement. Such additives are added in aqueous solution to a hydraulic cement at the construction site, or to the cement just prior to being taken to the construction site.

The term "hydraulic cement" as employed herein includes those inorganic cements which when mixed with water, set and harden as a result of chemical reactions between the water and the compounds present in Portland cement. The term "Portland cement" as used herein includes those products prepared by heating a mixture of limestone and clay or shale, or other calcareous and argillaceous materials to a fused state. The fused product which is called clinker, is interground with a few percent, normally about 4 to 6 percent by weight (% by wt) of a retarder such as gypsum. The term "concrete" as used herein includes a mixture of such portland cements and inert aggregates. Typical aggregates include conventional "coarse" aggregates such as gravel, granite, limestone, quartz, etc. as well as those materials conventionally referred to as "fine" aggregates such as sand and fly ash. Conventional portland cement concretes employ major amounts, that is more than 50% and usually up to about 75% by volume of such aggregates in the set product.

Calcium chloride ($CaCl_2$) is the most commonly used accelerator for concrete but promotes continuous oxidation of ferrous structural or reinforcing steel or aluminum conduits embedded in the concrete. $CaCl_2$ also adversely influences the concrete ifself, resulting in spalling and weakening. Where the concrete is in contact with moist soil, the attack of sulfates in the soil is enhanced. Therefore, even where there is no metal in the concrete, or corrosion of metal in the concrete is not a serious problem, the maximum amount of $CaCl_2$ per 94 pound (94 lb) bag of cement is no more than about 2 lb. Clearly, despite the low cost of $CaCl_2$, the problems associated with its use prejudice its desirability in reinforced concrete construction.

Retarding mixtures are frequently not used by themselves because of the problems associated with obtaining proper control of the setting times of the concrete or mortar, as more specifically disclosed in U.S. Pat. No. 4,089,695. To overcome undesirable effects of a retarder, known accelerators such as $CaCl_2$ and triethanolamine are used to balance out excess retardation, but the net effect of the combined ingredients of the patented additive composition is that it is a set-retarder. Unlike such a prior art composition, this invention utilizes a combination of accelerating and retarding ingredients which have the net effect of set-acceleration of a portland cement-containing composition.

One ingredient, a particular waste byproduct stream consisting essentially of a mixture of diethanolamine, triethanolamine ("DEA" and "TEA" respectively for brevity) and other byproducts, referred to herein as a waste polyethanolamine stream, belongs to the general class of alkanolamines some of which are disclosed as being accelerators in U.S. Pat. No. 2,437,842, when used by themselves in amounts in the range from 5.3% to 35.7% by wt based on the weight of portland cement. Subsequently it was discovered that neither diethanolamine nor triethanolamine were desirable accelerators because they have a weakening effect on the set concrete. At present, the use of polyalkanolamines, and particularly diethanolamine and triethanolamine are used only in admixture with other ingredients in concrete compositions because of the chemical interactions, as described in "Cement and Concrete Research," Ramachandran, V. S., 3, 41–54 (1973) and 6, 623–32 (1976). For example, polyalkanolamines are disclosed in U.S. Pat. No. 3,553,077 for their set-acceleration effect when used in combination with 20% by wt asbestos fiber and 30% by wt silica based on total solids.

The other essential ingredient of this invention, is calcium nitrate $Ca(NO_3)_2$ which purports to have an ambivalent function, working either as a set-accelerator or as a set-retarder, depending upon whether it is used alone, or upon what particular set-modifying ingredients are combined with it. For example, U.S. Pat. No. 3,782,992 to Uchikawa et al. discloses that $Ca(NO_3)_2$ when used alone is an effective retarder, one of the very oldest patents, U.S. Pat. No. 523,658 issued July 31, 1894, discloses that fermenting and decomposing organic matter mixed with $Ca(NO_3)_2$ is an effective retarder; but Russian Pat. No. 233,505 discloses that $Ca(NO_3)_2$ in combination with urea is an accelerator; and Russian Pat. No. 368,203 discloses that the combination of $Ca(NO_3)_2$ with $Ca(NO_2)_2$ and urea is also an accelerator. From my own tests, some of which are set forth herein in the Examples, I have found that aqueous $Ca(NO_3)_2$ solution when used by itself with Atlas Type I cement gives set-acceleration with increased compressive strengths, while with Huron Type I cement, under identical conditions, the $Ca(NO_3)_2$ solution provides set-acceleration and decreased compressive strength. Thus since one cannot expect to predict the behavior of cements even when $Ca(NO_3)_2$ solutions are used as the sole additive, it is even more difficult to predict its behavior in combination with other additives.

Calcium nitrite $Ca(NO_2)_2$ is known to be an accelerator for portland cement and is also disclosed to inhibit corrosion in reinforcing steel in U.S. Pat. No. 3,427,175 to Angstadt et al. Though this patent teaches that calcium nitrate $(CaNO_3)_2$ may be present in minor amounts as a contaminant when $Ca(NO_2)_2$ is produced, the quick-setting effect of $Ca(NO_3)_2$ was overlooked, as was its effect on compressive strength, since, under the circumstances, these properties could not have been evident. This oversight was further reconciled because of the general expectation that nitrate salts have a retardant effect in cement, rather than a quick-set effect. For example, U.S. Pat. No. 2,673,810 discloses that potassium nitrate is an effective retarder. Uchikawa, supra, discloses that nitrates of aluminum, ammonium, calcium, magnesium, potassium and sodium are all effective retarders. Moreover, though chlorides, sulfates and nitrates are all known as ingredients of set-modifying compositions for hydraulic cements, they are all generally accepted as producing undesirable corrosion on metal reinforcements, as disclosed in U.S. Pat. No. 3,782,984 to Allemand et al.

The aqueous $CaCl_2$-free additive composition of my invention is particularly valuable for decreasing the setting time and increasing the nearterm compressive strength, as well as the extended compressive strength of portland cement compositions and particularly portland cement concrete. Portland cement is the most commonly used hydraulic cement such as is designated by the specification set forth in ASTM C150-74. Many prior art references teaching additive compositions for cement fail to recognize the essentiality of excluding calcium chloride from a concrete composition suitable for use with metal reinforcing.

Thus, U.S. Pat. No. 4,116,706 to Previte teaches that a set-accelerating and compressive-strength enhancing composition for hydraulic cement may contain a major amount of a chloride, formate or nitrite salt set-accelerating agent, from about 1 to about 6% by wt of an amine, and from about 0.15 to about 3% by wt of a synthetic surface active agent (surfactant) having certain characteristics. Though the surfactants disclosed appear to contribute to the compressive strength of the concrete, there is no teaching as to their effect on retarding the oxidation of metal in the concrete if chloride salts are used.

Since the particular polyethanolamines DEA and TEA are known to provide desirable acceleration, as does monoethanolamine, the on-going challenge is to find a particular combination of ingredients in an additive composition which provides desirable set-acceleration and at the same time enhances compressive strength compared with concrete without the additive composition. Moreover, whether or not a specific alkanolamine is compatible with a co-accelerator is not predictable, and an overly broad disclosure with respect to the general usefulness of alkanolamines as co-accelerators is not only misleading but also unavoidably suggests combinations which are either ineffective set-accelerators, or which weaken the set concrete, or both.

Thus, to date, I am unaware of any additive composition for portland cements which utilize the combination of calcium nitrate with diethanolamine or triethanolamine, or a mixture of polyethanolamines, preferably admixed with an alkali metal or alkaline earth metal salt of a polyhydroxy aliphatic compound, or of lignosulfonic acid. From the prior art, I know of no reason to expect that such a combination would have such desirable effects on setting time and compressive strength. Moreover, particularly as alkanolamines are generally soluble in water or in aqueous salt solutions, but a waste polyalkanolamine stream comprising a major amount of triethanolamine is difficultly soluble in a concentrated aqueous solution of calcium nitrate, such a combination of a waste stream with $Ca(NO_3)_2$ appears to be ill-suited for a role as a practical and commercially attractive aqueous additive composition, stable enough for use in construction particularly during winter months.

SUMMARY OF THE INVENTION

It has been discovered that a plyalkanolamine waste byproduct stream known as "triethanolamine bottoms" (hereafter "TEA bottoms") may be used, in combination with aqueous calcium nitrate, as a co-accelerator and co-improver of compressive strength in an additive composition which decreases the normal setting time, and increases the normal compressive strength of a portland cement containing composition. The setting time of a wet concrete blank is referred to as the 'normal' setting time, and the compressive strength of the set blank after a predetermined period of time, is referred to as the 'normal' compressive strength, to indicate that these are the usual or normal values one would derive from the mortar or concrete formulated with the cement as received from its manufacturer.

More specifically it has been discovered that when a small amount of an additive composition comprising a concentrated aqueous solution of calcium nitrate, $Ca(NO_3)_2$, in combination with a minor amount of a polyalkanolamine, preferably such as is obtained in a TEA bottoms waste stream, is added to a portland cement containing composition, the additive composition provides advantageous and surprisingly good set-acceleration and compressive strength enhancement. Further, these advantages are realized without the deleterious effects associated with other accelerators such as calcium chloride on steel reinforcements conventionally used in reinforced concrete construction; and still further, it has been found that the desirable effects of this additive composition are enhanced by the addition of a minor amount of an alkali metal salt or an alkaline earth metal salt of a polysaccharide or of lignosulfonic acid.

It is therefore a general object of this invention to provide an aqueous $CaCl_2$-free additive composition for use with hydraulic cements of the portland type, which additive is in the form of an easily dispersed concentrated aqueous solution having at least 30 parts, and preferably from 40 to about 60 parts by weight of $Ca(NO_3)_2$ per 100 parts of additive composition which is stable during storage at 0° C. or even at temperatures substantially below 0° C., and which may be added to mortar or concrete (both generically referred to as "concrete" herein) just prior to being used at a construction site.

It is a specific object of this invention to provide an aqueous $CaCl_2$-free additive composition for a portland cement composition which additive accelerates the setting of concrete without a sacrifice in compressive strength which is actually enhanced both in the near-term, that is after about 3 days, and also in the long-term, that is after 28 days.

It was also discovered that the individual constituents DEA and TEA of a waste polyethanolamine byproduct stream are each co-accelerators for concrete when used in combination with aqueous $(Ca(NO_3)_2$, but that monoethanolamine ("MEA") is not; and further, that TEA, the major constituent of the waste stream, is substantially insoluble in a concentrated aqueous solution of $Ca(NO_3)_2$, but that the addition of an alkali metal salt or an alkaline earth metal salt of an aliphatic polyhydroxy compound such as gluconic acid, or such salt of lignosulfonic acid, solubilizes the triethanolamine and stabilizes the aqueous solution of co-accelerators so that the solution may be stored in containers at temperatures in the range from about 20° F. to about 140° F., then shipped for use at the construction site.

It is therefore another specific object of this invention to provide a process for reducing the setting time of a concrete mixture made with a portland cement composition and for increasing the compressive strength of a set concrete mixture at the end of a predetermined period of time, which process comprises adding to the cement composition an effective amount of an aqueous additive composition comprising, (i) $Ca(NO_3)_2$ in an amount from about 0.5 percent to about 3 percent by weight (% by wt) of said cement as an aqueous solution free of $CaCl_2$ to which solution is added (ii) diethanolamine, triethanolamine, or a mixture of polyethanolamines, in an amount in the range from about 0.005% to about 0.3% by wt of said cement, and (iii) an alkali metal salt or an alkaline earth metal salt of an organic stabilizer selected from the group consisting of an aliphatic polyhydroxy compound having from about 5 to about 9 carbon atoms and lignosulfonic acid, in an amount in the range from about 0.005% to about 0.1% by wt of said cement, whereby the concrete formed will develop a compressive strength of at least about 2500 psi at the end of 3 days.

DETAILED DESCRIPTION OF PREFERRED EMBODIMENTS

The additive composition of this invention is particularly suited for use in concrete intended for structural uses where accelerated set and high compressive strengths are especially sought.

Commercial hydraulic cements such as those of ASTM classifications Types I, II and III are most commonly used in construction, the particular type used depending upon the type of construction. The hardening or setting time is a function of many factors including ambient temperature, humidity, initial water content, type of cement used in the mix, and the like. The setting time decreases with increasing temperatures and increasing solids content of the concrete mix; and, the compressive strength of the set concrete progressively increases with time. The concrete compositions employ water to cement ratios of less than 1, usually from about 250 to about 300 pounds per cubic yard (lb/yd$^3$) of concrete. With a Type I cement, the concrete composition of this invention has a setting time of less than 4.5 hours (hr), and when hardened has a compressive strength which is typically in excess of 1000 pounds per square inch (psi) after 1 day, and 2500 psi after 3 days from preparation.

Because the compressive strength of the concrete, after it has set, varies with the water/cement ratio, comparisons between concrete mixes are made in relation to the ASTM "slump" test. Since the water is such an essential part of the reaction which forms concrete, it is desirable to use reasonably pure water free of electrolytes or contaminants which might adversely interfere with the desired setting and strength characteristics of the concrete.

The set-accelerating additive composition of this invention may include additional optional ingredients conventionally used to accelerate the set of concrete, provided no alkaline earth metal chloride such as calcium chloride is present, and provided further, such ingredients do not adversely affect the properties of concrete imparted by the additive composition of this invention.

As commercially practiced, the process of reducing the setting time and increasing the compressive strength developed by concrete incorporating the additive composition of this invention, as compared with concrete without the additive composition of this invention, comprises adding a sufficient amount of the composition to concrete to effect the desired set-acceleration and improvement in compressive strength of the concrete. The additive composition comprises an aqueous solution of Ca(NO$_3$)$_2$ to which is added an aqueous solution of TEA bottoms and an organic stabilizer which also acts as solubilizer for the polyethanolamines in the solution. The amount of TEA bottoms in the additive composition is in the range from about 0.05 part to about 10 parts per 100 parts of additive composition, and is more preferably in the range from about 0.05 to aabout 5 parts per 100 parts of additive composition. The organic stabilizer is selected from the group consisting of (a) an alkali metal salt or an alkaline earth metal salt of an aliphatic polyhydroxy compound having from about 5 to about 9 carbon atoms, and (b) an alkali metal salt or an alkaline earth metal salt of lignosulfonic acid. The amount of organic stabilizer in the additive composition is in the range from about 0.05 part to about 10 parts per 100 parts by wt of additive composition.

In a typical operation, the enhancement of compressive strength and set-acceleration is obtained by adding (i) Ca(NO$_3$)$_2$ in an amount from about 0.5% to about 3% by wt of the portland cement in the concrete, to which solution is added (ii) from about 0.005% to about 0.3% by wt of the cement, of DEA, or, TEA. The concrete formed develops a compressive strength of at least 2500 psi after 72 hr as measured in accordance with ASTM C-109 test method using a 1.0 cement to a 1.25 aggregate mix with 17% by weight water.

It is immaterial what form the Ca(NO$_3$)$_2$ salt may have, whether in the form of anhydrous crystals, or crystals with water of crystallization associated therewith, the only essential requirement being that an aqueous solution of the salt, free from CaCl$_2$, is formed. Since the additive composition will generally be shipped to the construction site at which it is to be used, it is preferred to have as concentrated an aqueous solution of Ca(NO$_3$)$_2$ as will be stable in the range from 32° F. to 140° F. and keep the solids in solution at a low temperature in the range from about −10° C. to about 0° C. The amount of salt which can be dissolved will be limited not only (i) by the saturation concentration of salt in the solution at the temperature of the water when the solution is made, but also (ii) by the tendency of the salt to precipitiate from solution in cold weather, and, as will presently be explained, (iii) the difficulty of dissolving specific polyethanolamines in a relatively concentrated aqueous solution of calcium nitrate. It is most preferred to form a relatively concentrated aqueous solution by dissolving at least 30 parts by weight of Ca(NO$_3$)$_2$ in 100 parts of water at room temperature of about 20° C., and more preferably from about 40 to 60 parts per 100 parts of Ca(NO$_3$)$_2$ solution, so that its specific gravity is in the range from about 1.4 to about 1.5. Minor amounts of calcium nitrite Ca(NO$_2$)$_2$, if present with the Ca(NO$_3$)$_2$, will not be detrimental to the development of desirable set-periods and compressive strengths in the concrete.

To the relatively concentrated solution of Ca(NO$_3$)$_2$ is added a solution of TEA bottoms to which has been added a sufficient amount of stabilizer to solubilize the TEA bottoms in the solution. It is particularly to be noted that monoethanolamine ("MEA") does not produce the effects that are desired in this invention. DEA and TEA, each used by itself as the only polyethanolamine, is effective to give set acceleration and enhancement of compressive strength with the aqueous solution of Ca(NO$_3$)$_2$ specified hereinabove, when each is used in the range from 0.005% to about 3% by wt of the portland cement in the concrete. The DEA, if used as the only polyethanolamine, may simply be added to the aqueous solution of CA(NO$_3$)$_2$ and is dissolved in it by vigorous stirring so as to form a solution which is stable even when the temperature of the solution reaches 0° C. However, when TEA is used as the only polyethanolamine, in an amount within the range stated, the TEA does not dissolve in the Ca(NO$_3$)$_2$ solution, and even after vigorous stirring, does not remain dispersed in the solution. The waste TEA bottoms stream, which comprises a major amount by wt of TEA in the waste stream, behaves in a manner analogous with that of TEA.

To keep the TEA or the TEA bottoms homogeneously dispersed in the aqueous solution of $Ca(NO_3)_2$ it is necessary to add a small but effective amount of an organic stabilizer such as an aliphatic polyhydroxy compound or salt of lignosulfonic acid which stabilizer itself is soluble in water. By the term "soluble in water" is meant that the material is soluble in water to the extent of at least 10 parts per 100 parts by wt of water. Preferred are the alkali metal salts and alkaline earth metal salts of polysaccharides particularly those having from 5 to about 9 carbon atoms, and, the alkali metal salts and alkaline earth metal salts of lignosulfonic acid. Most preferred are sodium glucoheptonate and soium lignosulfonic acidbot of which are generally used in the concrete art as set-retarders. The upper limit of the amount of organic stabilizer used is critical since a larger amount than specified will have a detrimental effect on the set-acceleration.

For optimum stability it is desirable to adjust the pH of the additive composition so that it falls within the range from about 7 to 9.

Though the invention has been described hereinabove with particular respect to polyethanolamines and specifically with respect to TEA bottoms, the invention may also be practiced with dialkanolamines such as diethanolamine, or any other polyalkanolamine, without the addition of the organic stabilizer, if the polyalkanolamine additive is stable and soluble in the aqueous $Ca(NO_3)_2$ solution. Useful polyalkanolamines in this invention are derived from other lower alkanols, that is, those alkanols having from 2 to 5 carbon atoms. For example, polyalkanolamines derived by substitution of hydrogen atoms in ammonia with propanol, isopropanol, butanol, isobutanol, and pentanols, are each difficultly soluble in aqueous calcium nitrate, particularly concentrated aqueous calcium nitrate solutions having more than 30 parts by wt of $Ca(NO_3)_2$ per 100 parts of calcium nitrate solution.

In the examples of this invention all parts refer to parts by weight unless otherwise specified. In all cases, the DEA and TEA used are about 99% pure, and the $Ca(NO_3)_2$ is industrial grade. Substantially pure DEA and TEA are used to show their individual effects; the DEA and TEA are used in combination in the examples, rather than the TEA waste bottoms stream, because the waste stream is not reproducible. The following examples illustrate the effect of small amounts of the composition of this invention upon the setting time and compressive strength of Portland cement concretes which were prepared in accordance with ASTM procedures, and measurements of water to cement ratio, slump, and compressive strengths of the hydrated concretes made in each case, were also made using ASTM procedures. For comparison, a "blank" containing no set-modifying additive was identically prepared and tested. As will be understood, measurements are first made with respect to the "blank" composition. The composition containing the stated amount of the set-accelerating additive composition of the invention is then prepared with sufficient water to give a "slump" as close as possible to that exhibited by the blank, plus or minus about 0.5 inch. The amount of water actually used is recorded for calculation of the water/cement ("W/C") ratio, and subsequently the compressive strengths at 1, 3, 7 and 28 days are measured. Specific brand names of cement are used in the examples because of their general availability, and to demonstrate that the effect of $Ca(NO_3)_2$ solution by itself is not predictable in commercially available cements. With the incorporation of the additive composition of this invention in concrete, this unpredictability is no longer an extant factor.

EXAMPLES WITH ATLAS ® BRAND TYPE I CEMENT

In the following examples, wet concrete mixes were formulated with varying concentrations of $Ca(NO_3)_2$, DEA, TEA and sodium glucoheptonate (SGH) using Atlas ® brand Type I portland cement. Enough water, in the range from about 240 to 280 lb/yd$^3$ of concrete, is added to give the same slump as the blank (about 2.5") within ±0.5". The amount of each ingredient of the set-accelerating composition is stated as the percent by weight on a water-free basis, of the cement in the mix. The setting time is determined according to ASTM Standard Method of Test for Time and Setting of Hydraulic Cement by Vicat Needle (ASTM C 191-58) and the setting times are recorded, as are the compressive strengths as measured after the indicated number of days, herebelow in Table 1.

TABLE 1

| Amt. of additive, water-free basis, as % by wt of cement | | | | (using Atlas ® Type I cement) | | | | | | | |
|---|---|---|---|---|---|---|---|---|---|---|---|
| | | | | Water | Slump | Air | Setting Time | Compressive Strength psi | | | |
| $Ca(NO_3)_2$ | DEA | TEA | SGH | #/yd$^3$ | (ins) | % | Hr.-mins. | 1 day | 3 days | 7 days | 28 days |
| blank | | | | 268 | 2.75 | 1.3 | 5:44 | 971 | 2346 | 3458 | 4917 |
| 0.50 | | | | 268 | 3.0 | 1.3 | 5:04 | 1098 | 2411 | 3533 | 5136 |
| 1.0 | | | | 261 | 2.75 | 1.2 | 4:33 | 1146 | 2577 | 3692 | 5281 |
| 1.5 | | | | 258 | 2.5 | 1.2 | 4:02 | 1186 | 2706 | 3891 | 5482 |
| 2.0 | | | | 253 | 2.5 | 1.1 | 3:50 | 1225 | 2905 | 3915 | 5597 |
| 0.5 | | 0.005 | 0.005 | 258 | 3.0 | 1.3 | 4:52 | 114 | 2554 | 3788 | 5278 |
| 1.0 | | 0.005 | 0.005 | 252 | 2.75 | 1.3 | 4:15 | 1241 | 2897 | 3871 | 5527 |
| 1.5 | | 0.005 | 0.005 | 248 | 2.25 | 1.2 | 3:57 | 1265 | 2976 | 3993 | 5742 |
| 0.5 | | 0.005 | 0.05 | 250 | 2.75 | 1.3 | 5:18 | 1106 | 2626 | 3829 | 5395 |
| 1.0 | | 0.005 | 0.05 | 245 | 3.0 | 1.2 | 4:58 | 1194 | 3024 | 3998 | 5734 |
| 1.5 | | 0.005 | 0.05 | 243 | 3.0 | 1.2 | 4:20 | 1202 | 3143 | 4234 | 5888 |
| 2.0 | | 0.005 | 0.05 | 243 | 2.75 | 1.1 | 4:05 | 1297 | 3334 | 4475 | 6123 |
| 0.50 | 0.05 | | | 258 | 3.0 | 1.3 | 4:38 | 1194 | 2594 | 3844 | 5309 |
| 0.5 | 0.15 | | | 253 | 2.5 | 1.2 | 4:15 | 1170 | 2682 | 3901 | 5495 |
| 1.0 | 0.05 | | | 248 | 2.75 | 1.2 | 4:03 | 1225 | 2920 | 4071 | 5516 |
| 1.0 | 0.15 | | | 248 | 3.0 | 1.4 | 3:38 | 1257 | 3088 | 4153 | 5682 |
| 1.5 | 0.05 | | | 248 | 2.5 | 1.2 | 3:43 | 1225 | 3096 | 4276 | 5797 |
| 1.5 | 0.15 | | | 248 | 3.0 | 1.3 | 3:18 | 1241 | 3191 | 4354 | 5831 |

EXAMPLES WITH HURON® BRAND TYPE I CEMENT

In the following examples, wet concrete mixes were formulated with varying concentrations of Ca(NO$_3$)$_2$, DEA, sodium glucoheptonate (SGH) and sodium lignosulfonic acid (SLS), using Huron® brand Type I portland cement. Enough water, in the range from about 240 to 280 lb/yd$^3$ of concrete, is added to give the same slump as the blank (about 2.5") within ±0.5". The amount of each ingredient of the set-accelerating composition is stated as the percent by weight on a water-free basis, of the cement in the mix. The setting time is determined according to ASTM Standard Method of Test for Time and Setting of Hydraulic Cement by Vicat Needle (ASTM C 191-58) and the setting times are recorded, as are the compressive strengths as measured after the indicated number of days, hereinbelow in Table 2. Compressive strengths were measured on the fourth day, instead of the conventional third, because of a holiday.

TABLE 2

(using Huron® Type I cement)

| Amt. of additive, water-free basis, as % by wt of cement | | | | Water #/yd$^3$ | Slump (ins) | Air % | Setting Time Hr.-mins. | Compressive Strength, psi | | | |
|---|---|---|---|---|---|---|---|---|---|---|---|
| Ca(NO$_3$)$_2$ | DEA | SGH | SLS | | | | | 1 day | 4 days | 7 days | 28 days |
| blank | | | | 279 | 3.0 | 1.9 | 5:35 | 2012 | 3799 | 4556 | 5571 |
| 0.5 | | | | 268 | 3.0 | 2.0 | 4:51 | 2053 | 3979 | 4586 | 5849 |
| 1.0 | | | | 268 | 3.0 | 1.8 | 4:15 | 1763 | 3681 | 4432 | 5815 |
| 1.5 | | | | 263 | 2.5 | 1.8 | 3:56 | 1866 | 3780 | 4635 | 5801 |
| 2.5 | | | | 263 | 2.5 | 1.9 | 2:52 | 1878 | 3860 | 4556 | 5861 |
| 0.5 | 0.05 | | | 260 | 2.75 | 2.1 | 4:33 | 2234 | 4056 | 4819 | 6004 |
| 1.0 | 0.05 | | | 260 | 3.0 | 2.1 | 3:42 | 2281 | 4194 | 4956 | 6198 |
| 1.5 | 0.05 | | | 260 | 2.5 | 1.9 | 3:24 | 2315 | 4234 | 5024 | 6251 |
| 0.5 | 0.1 | | | 260 | 2.75 | 2.2 | 4:04 | 2301 | 4176 | 5072 | 6226 |
| 1.5 | 0.10 | | | 260 | 3.0 | | 3:14 | 2351 | 4298 | 5243 | 6461 |
| 0.5 | 0.05 | 0.025 | | 258 | 2.5 | 2.3 | 4:45 | 2293 | 4225 | 4986 | 6194 |
| 1.5 | 0.05 | 0.025 | | 258 | 2.75 | 2.2 | 3:40 | 2343 | 4375 | 5312 | 6413 |
| 0.5 | 0.05 | | 0.025 | 251 | 3.0 | 2.1 | 4:42 | 2251 | 4273 | 5041 | 6204 |
| 1.5 | 0.05 | | 0.025 | 251 | 3.25 | 2.3 | 3:30 | 2315 | 4361 | 5354 | 6518 |

It is evident from the foregoing data that, with Atlas Type I cement, Ca(NO$_3$)$_2$ solution itself provides set-acceleration and improved compressive strength both of which are further enhanced by the addition of either DEA, or TEA and sodium glucoheptonate (SGH), in the amounts disclosed. However, from the data with Huron Type I cement it is evident that Ca(NO$_3$)$_2$ solution by itself produces set-acceleration but a weakening of the concrete. Both the setting time and the compressive strength of concrete made with Huron Type I cement are improved by the addition of DEA, or by the addition of DEA combined with either SGH or SLS. In an analogous manner, it is found that set-acceleration and improved compressive strengths are obtained by the addition of TEA in combination with either SGH or SLS; and also, with the addition of both DEA and TEA in combination with either SGH or SLS.

EXAMPLES WITH ATLAS® BRAND TYPE I CEMENT

In the following examples, wet concrete mixes were formulated with varying concentrations of Ca(NO$_3$)$_2$, DEA and TEA using Atlas® brand Type I portland cement. Enough water, in the range from about 240 to 280 lb/yd$^3$ of concrete, is added to give the same slump as the blank (about 2.5") within ±0.5". The amount of each ingredient of the set-accelerating composition is stated as the percent by weight on a water-free basis, of the cement in the mix. The initial and final setting times at 40° F. were determined according to the ASTM Standard Method of Test for Time and Setting of Hydraulic Cement by Vicat Needle (ASTM C 191-58) and the setting times are recorded herebelow in Table 3.

TABLE 3

(using Atlas® Type I cement)

| Ca-nitrate Ca(NO$_3$)$_2$ | NH(CH$_2$CH$_2$OH)$_2$ (DEA)(%) | N(CH$_2$CH$_2$OH)$_3$ (TEA)(%) | Setting Time (min) | |
|---|---|---|---|---|
| | | | Initial | Final |
| 0 | 0 | 0 | 146 | 175 |
| 0.25 | 0 | 0 | 138 | 165 |
| 0.50 | 0 | 0 | 110 | 140 |
| 1.0 | 0 | 0 | 98 | 125 |
| 1.5 | 0 | 0 | 83 | 115 |
| 2.5 | 0 | 0 | 62 | 80 |
| 0.25 | 0.05 | 0 | 108 | 140 |
| 0.25 | 0.15 | 0 | 96 | 125 |
| 0.25 | 0.25 | 0 | 72 | 100 |
| 0.5 | 0.01 | 0 | 96 | 125 |
| 0.5 | 0.05 | 0 | 85 | 115 |
| 0.5 | 0.15 | 0 | 72 | 105 |
| 0.5 | 0.25 | 0 | 45 | 75 |
| 1.0 | 0.01 | 0 | 89 | 115 |
| 1.0 | 0.05 | 0 | 79 | 110 |
| 1.0 | 0.15 | 0 | 54 | 75 |
| 1.0 | 0.25 | 0 | 42 | 65 |
| 1.0 | 0.5 | 0 | 40 | 55 |
| 1.5 | 0.05 | 0 | 74 | 105 |
| 1.5 | 0.15 | 0 | 44 | 70 |
| 1.5 | 0.25 | 0 | 40 | 65 |
| 2.5 | 0.05 | 0 | 57 | 85 |

TABLE 3-continued

| | (using Atlas® Type I cement) | | | |
|---|---|---|---|---|
| Ca-nitrate | NH(CH₂CH₂OH)₂ | NH(CH₂CH₂OH)₃ | Setting Time (min) | |
| Ca(NO₃)₂ | (DEA)(%) | (TEA)(%) | Initial | Final |
| 2.5 | 0.15 | 0 | 40 | 50 |
| 2.5 | 0.25 | 0 | 40 | 75 |
| 0.5 | 0 | 0.005 | 102 | 130 |
| 0.5 | 0 | 0.010 | 95 | 125 |
| 0.5 | 0 | 0.015 | 91 | 125 |
| 0.5 | 0 | 0.025 | 112 | 140 |
| 1.0 | 0 | 0.005 | 87 | 115 |
| 1.0 | 0 | 0.01 | 81 | 115 |
| 1.0 | 0 | 0.015 | 82 | 120 |
| 1.0 | 0 | 0.025 | 89 | 125 |
| 2.5 | 0 | 0.005 | 56 | 75 |
| 2.5 | 0 | 0.025 | 88 | 105 |

EXAMPLES USING MEDUSA® TYPE II CEMENT

In the following examples, wet concrete mixes were formulated with varying concentrations of Ca(NO₃)₂, DEA and TEA using Medusa® brand Type II portland cement. Enough water, in the range from about 240 to 280 lb/yd³ of concrete, is added to give the same slump as the blank (about 2.5") within ±0.5". The amount of each ingredient of the set-accelerating composition is stated as the percent by weight on a water-free basis, of the cement in the mix. The initial and final setting times at 70° F. were determined according to the ASTM Standard Method of Test for Time and Setting of Hydraulic Cement by Vicat Needle (ASTM C 191-58) and the setting times are recorded hereinbelow in Table 4.

From the foregoing examples one will readily appreciate that the precise amount of additive composition used will depend upon the type of cement in the concrete, the specifications the concrete is to meet after a predetermined period of days, and the particular construction in which it is to be used, for example, the type of metal to be embedded in the concrete. In the best mode, a preferred additive composition contains TEA bottoms in which TEA is present in an amount in the range from about 50 to 80% by wt, and the DEA is present in aan amount in the range from about 10 to 15% by weight, the remaining being an unidentified mixture of amines. Enough sodium glucoheptonate in the range from about 0.3 to about 0.6 parts per 100 lbs of solution is added to solubilize the TEA bottoms. The additive composition has a specific gravity in the range from about 1.4 to about 1.5 and the pH is adjusted in the range from 7 to 10, preferably between 7 and 8. Depending upon the specific requirements for the cured concrete, this composition is used in the range from about 10 to about 50 fluid ounces per 100 lb of cement, and more preferably in the range from about 20 to 30 oz. per sack of cement.

TABLE 4

| | (using Medusa® Type II cement) | | | |
|---|---|---|---|---|
| Ca-nitrate | NH(CH₂CH₂OH)₂ | NH(CH₂CH₂OH)₃ | Setting Time (min) | |
| Ca(NO₃)₂ (%) | (DEA) (%) | (TEA) (%) | Initial | Final |
| 0 | 0 | 0 | 190 | 215 |
| 0.5 | 0 | 0 | 162 | 180 |
| 1.0 | 0 | 0 | 120 | 135 |
| 1.5 | 0 | 0 | 102 | 117 |
| 2.5 | 0 | 0 | 65 | 90 |
| 0.5 | 0.01 | 0 | 140 | 155 |
| 0.5 | 0.05 | 0 | 135 | 150 |
| 0.5 | 0.15 | 0 | 70 | 83 |
| 0.5 | 0.25 | 0 | 45 | 65 |
| 1.0 | 0.01 | 0 | 97 | 110 |
| 1.0 | 0.05 | 0 | 90 | 105 |
| 1.0 | 0.15 | 0 | 58 | 74 |
| 1.0 | 0.25 | 0 | 40 | 60 |
| 1.5 | 0.01 | 0 | 85 | 105 |
| 1.5 | 0.05 | 0 | 70 | 85 |
| 1.5 | 0.25 | 0 | 35 | 50 |
| 1.5 | 0.25 | 0 | 40 | 50 |
| 0.5 | 0.005 | 0 | 135 | 150 |
| 0.05 | 0.015 | 0 | 115 | 135 |
| 1.0 | 0.005 | 0 | 98 | 115 |
| 1.0 | 0.015 | 0 | 90 | 105 |
| 1.5 | 0.005 | 0 | 85 | 100 |
| 1.5 | 0.015 | 0 | 80 | 97 |
| 2.5 | 0.05 | 0 | 55 | 70 |
| 2.5 | 0.15 | 0 | 44 | 65 |
| 2.5 | 0.25 | 0 | 44 | 60 |
| 2.5 | 0.5 | 0 | 65 | 90 |
| 1.0 | 0 | 0.005 | 108 | 125 |
| 1.0 | 0 | 0.01 | 96 | 115 |
| 1.0 | 0 | 0.015 | 88 | 105 |
| 1.0 | 0 | 0.02 | 105 | 140 |

EXAMPLES WITH BESSEMER ® TYPE III CEMENT

In a manner analogous to that described hereinabove for the Examples prepared with Bessemer ® Type II portland cement, wet concrete mixes were prepared with Ca(NO$_3$)$_2$, DEA and TEA using a Bessemer Type III cement and the initial and final setting times at 70° F. were recorded, and are set forth hereinbelow in Table 5.

TABLE 5

| (using Bessemer ® Type III cement) | | | | |
|---|---|---|---|---|
| Ca-nitrate Ca(NO$_3$)$_2$ (%) | NH(CH$_2$CH$_2$OH)$_2$ DEA (%) | NH(CH$_2$CH$_2$OH)$_3$ TEA (%) | Setting Time (min) Initial | Final |
| 0 | 0 | 0 | 80 | 100 |
| 0.5 | 0 | 0 | 65 | 83 |
| 1.0 | 0 | 0 | 55 | 70 |
| 1.5 | 0 | 0 | 41 | 55 |
| 1.0 | 0.05 | 0 | 50 | 60 |
| 1.0 | 0.15 | 0 | 35 | 50 |
| 1.0 | 0.25 | 0 | 30 | 50 |
| 1.0 | 0.5 | 0 | 40 | 60 |
| 1.0 | 0 | 0.005 | 50 | 62 |
| 1.0 | 0 | 0.01 | 43 | 55 |
| 1.0 | 0 | 0.015 | 40 | 50 |
| 1.0 | 0 | 0.02 | 55 | 65 |

I claim:

1. An additive composition to decrease the normal setting time and increase the normal compressive strength of a portland cement containing composition such as mortar and concrete, consisting essentially of, an aqueous solution of (i) calcium nitrate present in an amount of at least 30 parts by weight per 100 parts of said solution, and (ii) a polyalkanolamine of a lower alkanol having from 2 to about 5 carbon atoms, said polyalkanolamine being present in an amount in the range from about 0.05 parts to about 5 parts per 100 parts by weight of said solution, said solution being stable in storage in the temperature range from about 32° F. to about 140° F.

2. The additive composition of claim 1 including in addition an alkali metal salt or alkaline earth metal salt of an organic stabilizer selected from the group consisting of an aliphatic polyhydroxy compound having from about 5 to about 9 carbon atoms, and lignosulfonic acid, said stabilizer being present in an amount in the range from 0.010 parts to about 5 parts per 100 parts by weight of said solution.

3. The additive composition of claim 2 wherein said polyalkanolamine is a mixture of polyethanolamines including a major amount of triethanolamine and a minor amount of diethanolamine.

4. The additive composition of claim 3 wherein said polyethanolamines are present in a triethanol bottoms waste stream containing from 50–80 percent by weight of triethanolamine, and from about 10 to 15 percent by weight of diethanolamine.

5. The additive composition of claim 3 wherein said organic stabilizer is selected from sodium glucoheptonate and sodium lignosulfonic acid.

6. The additive composition of claim 4 wherein said aqueous solution consists essentially of (i) a calcium nitrate solution containing from about 40 to 60 parts by weight of calcium nitrate per 100 parts of said solution, (ii) said polyethanolamines are present in a waste polyethanolamine stream comprising a major amount of triethanolamine by weight, said waste stream being present in an amount in the range from about 0.05 part to about 15 parts by weight per 100 parts by weight of said aqueous solution, and (iii) said organic stabilizer is present in an amount in the range from about 0.05 part to about 10 parts by weight per 100 parts of said aqueous solution.

7. The additive composition of claim 6 having a pH in the range from about 7 to about 10, and a specific gravity in the range from about 1.4 to about 1.5.

8. A concrete mix comprising a portland cement and a set-accelerating additive composition consisting essentially of (i) Ca(NO$_3$)$_2$ in an amount from about 0.5 percent to about 3 percent by weight of said cement as an aqueous solution free of CaCl$_2$ to which solution is added (ii) diethanolamine, triethanolamine, or a mixture of polyethanolamines, in an amount in the range from about 0.005% to about 0.3% by wt of said cement, and optionally, (iii) an alkali metal salt or an alkaline earth metal salt of an organic stabilizer selected from the group consisting of an aliphatic polyhydroxy cpmpound having from about 5 to about 9 carbon atoms and lignosulfonic acid, in an amount in the range from about 0.005% to about 0.1% by wt of said cement, whereby the concrete formed will develop a compressive strength of at least about 2500 psi at the end of 3 days.

9. The concrete mix of claim 8 wherein said salt of said aliphatic polyhydroxy compound is sodium glucoheptonate and said salt of lignosulfonic acid is sodium lignosulfonic acid.

10. A process for reducing the setting time of a concrete mixture made with a portland cement composition and for increasing the compressive strength of a set concrete mixture at the end of a predetermined period of time, which process comprises adding to the cement composition an effective amount of an aqueous additive composition consisting essentially of, (i) Ca(NO$_3$)$_2$ in an amount from about 0.5 percent to about 3 percent by weight of said cement as an aqueous solution free of CaCl$_2$ to which solution is added (ii) diethanolamine, triethanolamine, or a mixture of polyethanolamines, in a combined amount in the range from about 0.005% to about 0.3% by wt of said cement, and, optionally, (iii) an alkali metal salt or an alkaline earth metal salt of an organic stabilizer selected from the group consisting of an aliphatic polyhydroxy compound having from about 5 to about 9 carbon atoms and lignosulfonic acid, in an amount in the range from about 0.005% to about 0.1% by wt of said cement, whereby the concrete formed will develop a compressive strength of at least about 2500 psi at the end of 3 days.

* * * * *